United States Patent [19] 3,685,192
Stibbard [45] Aug. 22, 1972

[54] FISH LURE
[72] Inventor: Frank C. Stibbard, 185 Wellington St., Belleville, Ontario, Canada
[22] Filed: Feb. 20, 1970
[21] Appl. No.: 13,035

Related U.S. Application Data

[63] Continuation-in-part of Ser. No. 849,943, Aug. 12, 1969, abandoned.

[52] U.S. Cl. ............43/42.04, 43/42.24, 43/42.35, 43/42.47
[51] Int. Cl. ..........................................A01k 85/02
[58] Field of Search............43/42.04, 42.05, 42.24

[56] References Cited

UNITED STATES PATENTS 2,190,449  2/1940  Goldammer............43/42.04
2,820,315  1/1958  Lowe...................43/42.04
3,490,165  1/1970  Thomassin...........43/42.24 X
2,582,627  1/1952  Gaylord................43/42.05

Primary Examiner—Samuel Koren
Assistant Examiner—Daniel J. Leach
Attorney—Kent & Ade

[57] ABSTRACT

A fish shaped lure of soft resilient plastic with neutral buoyancy imparting means formed therein. A line attaching nose wire extends forwardly and a snelled hook is also attached to this nose wire. The snelled hook is detachably held along the underside of the line until a fish strikes whereupon it detaches from the underside so that the strain of the fish is taken directly to the nose wire and hence to the line.

21 Claims, 11 Drawing Figures

PATENTED AUG 22 1972 3,685,192

INVENTOR.
FRANK C STIBBARD

BY

PATENTED AUG 22 1972 3,685,192

INVENTOR.
FRANK C STIBBARD
BY
ATT'YS.

FISH LURE

This invention relates to new and useful improvements in fish lures and constitutes a continuation-in-part of my application Ser. No. 849,943, filed Aug. 12, 1969, now abandoned the principle object being to provide a plastic lure made of soft flesh-like plastic in the shape of a minnow or shiner having neutral buoyancy and a natural swimming motion. Furthermore, an object is to provide a lure of the class described in which the strain of the fish engaged by the hook is transferred directly to the leader rather than passing through the lure, it being understood that a flexible soft lure may readily become damaged despite the fact that such plastic is relatively tough.

There are, of course, many lures on the market all of which attempt to approximate the action of a smaller fish such as a minnow or shiner, such minnows or shiners being the natural prey of the majority of game fish sought in fresh water, salt water, lakes, streams and rivers.

This natural action is normally initiated by the movement of the lure through the water on the end of the line either by trolling or by casting and retrieving, it not being usual to use such lures for still fishing. However, the present lure can be used for still fishing due to neutral buoyancy.

The natural action sought by other type lures, is arrived at by a variety of methods and construction, all of which require a relatively fast movement of the lure through the water in order to initiate such action. However, it is well known that a lure which can be moved relatively slowly through the water stands the best chance of attracting game fish but only if the natural action can be imitated at the normal swimming speed of the live minnow. Aside from flies, lures fall into two categories, floating and non-floating. The floating types are fully buoyant and are sinkable only by adding sufficient weight. Sinking lures are kept from bottoming only by speed of retrieve or length of fishing line or both. Some lures have a large scoop on the front to force them down by very fast retrieve.

The majority of surface lures are made from a material having buoyancy so that the lure normally would float to the surface. These lures are normally submerged by the use of weights. Weighted surface and heavier-than-water lures are fished at required depths either by length of fishing line or speed of retrieve or both, at excessive speeds. However, such lures being made of wood or balsa wood or the like, are usually best operated adjacent the bottom of the river or lake or at least submerged although at times, a certain game fish will take what is known as a surface lure. The buoyancy or depth control is therefore usually obtained by adding weights to the line or leader in advance of the lure but it will be appreciated that the required depth can only be maintained if the speed of the lure through the water and the length of line extending from the rod, remains constant and it will be appreciated that these two conditions are extremely difficult to maintain.

Attempts have been made to manufacture a lure of relatively soft material such as plastic or balsa wood with the hooks being attached to the lure and the lure in turn being attached to the leader and line. Unfortunately such lures are easily damaged when a fish strikes and the strain is transferred directly to the leader through the lure itself. It is therefore one of the principle objects of the present device to provide means whereby the strain of the fish on the hook is transferred directly to the leader and line once the fish has struck and has been hooked.

Finally, it is one of the objects of the invention to provide a life-like lure of soft resilient plastic having in some instances means to articulate the rear end relative to the front portion and which furthermore, due to the relatively slow trolling or retrieving movement required, easily avoids obstructions due to the pressure wave built up in front of and surrounding the lure.

Summarizing, I have provided a fish-shaped lure of soft resilient plastic aiming to be an exact reproduction of a shiner, minnow or the like and having means to provide neutral buoyancy and a natural swimming action with a relatively slow movement through the water and which furthermore includes means to transfer the strain of a fish hooked directly to the leader and line of the angler.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept reference being had to the accompanying Figures in which:

In the drawings like characters of reference indicate corresponding parts in the different figures.

Figure 1:
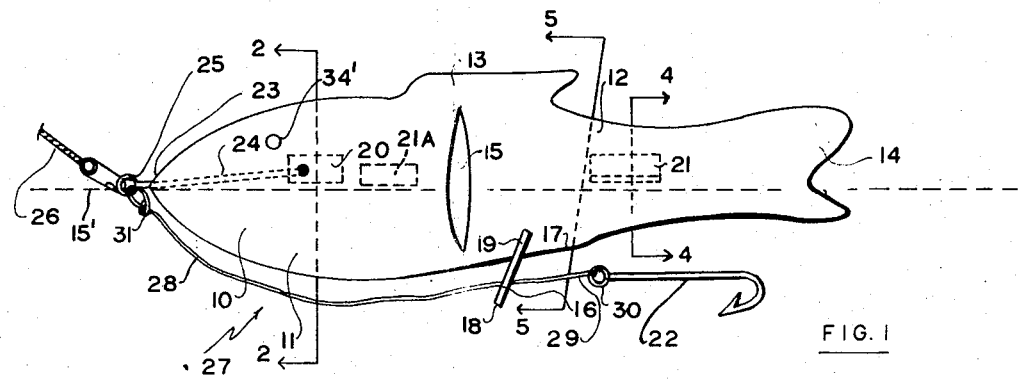
FIG. 1 is a side elevation of one embodiment of the lure.

Proceeding therefore to describe the invention in detail with respect to FIGS. 1 to 7 inclusive, reference character 10 illustrates the body portion of the lure which is made of a soft flesh-like plastic provided with exterior marking and coloring (not illustrated) designed to imitate a conventional shiner, minnow or the like normally used as bait in fresh and salt water fishing.

Figure 2:
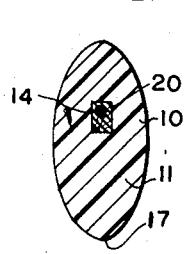
FIG. 2 is a section along the line 2—2 of FIG. 1.
Figure 4:
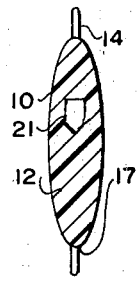
FIG. 4 is a section along the line 4—4 of FIG. 1.
Figure 5:
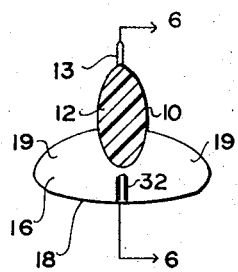
FIG. 5 is a section along the line 5—5 of FIG. 1.
Figure 6:
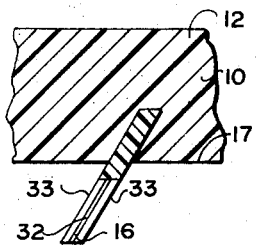
FIG. 6 is a fragmentary section along the line 6—6 of FIG. 5.
Figure 3:
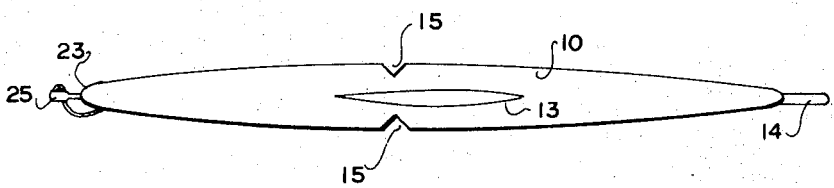
FIG. 3 is a top plan view of FIG. 1.

The lure in various cross sections is shown in FIGS. 2, 4 and 5 from which it will be observed that the cross sectional configuration is conventional. The lure includes a front part 11 and a rear part 12 with a vertical dorsal fin 13 spanning the two parts upon the upper side thereof. The tail portion 14 is conventional in configuration as clearly shown and the dotted line 15' shown in FIG. 1, illustrates the longitudinal axis of the lure, said lure being substantially symmetrical therearound insofar as configuration is concerned.

The junction between the front part and the rear part of the body portion 10 is provided with a vertically situated V slot or groove 15 formed on the outer sides of the body thus permitting the rear part and front part to articulate in a horizontal plane relative to one another. Means is provided to initiate this articulation and consists of a baffle fin 16 formed integrally with the rear part 12 of the body and extending downwardly and forwardly from the underside 17 as clearly shown in FIG. 1, the configuration of the baffle being shown more clearly in FIG. 6. It consists of a substantially planar base edge 18 and arcuately curved upwardly and inwardly inclining side edges 19.

I have found, through experimentation, that the angle of inclination from the vertical of this baffle fin 16 should be approximately 5°.

Means is provided to control the buoyancy of the lure, it being desirable that this buoyancy be completely neutral so that the lure will neither sink nor rise once positioned in the water. In the front part 11 I embed a cubicle piece of buoyancy controlling material such as wood indicated by the reference character 20. In the rear part 12 I seal an air chamber 21 the configuration of which is shown in the cross sectional view in FIG. 4. Both the material 20 and the air chamber 21 are preferably just above the longitudinal axis of the lure so that the center of gravity of the lure is below the longitudinal axis thus assisting the lure to remain upright when in the water.

The material 20, giving neutral buoyancy to the front portion by counteracting the weight of the front part and the air chamber or cavity 21, counteracts not only the weight of the rear part but also of the hook 22 which is normally suspended just below the rear part as will hereinafter be described.

Secured to the block of material 20 and extending forwardly through the front part 11 of the lure to the nose 23 thereof, is a length of wire 24 terminating in a loop or ring 25 just forwardly of the nose 23. This enables a conventional leader 26 to be secured in the usual way, said leader in turn being connected to the fishline (not illustrated).

The hook assembly collectively designated 27 takes the form of a snelled hook with the aforementioned hook 22 being secured to the snell 28 normally of plastic line such as Nylon. The rear end 29 of the snell is secured to the eye 30 of the hook in the usual way and the front end 31 of the snell may be secured to the ring or loop 25 also in the usual way by looping through the ring and tieing the snell thereto. Means is provided to support the hook in the position shown in FIG. 1 during the fishing operation and until the lure is struck by a fish. This means consists of a vertically situated slot 32 formed centrally in the baffle fin 16, said slot extending upwardly adjacent the underside 17 of the rear part 12. The front and rear vertical edges 33 of this slot are chamfered to facilitate the engagement of the snell within this slot, it being understood that the snell is retained in the slot by friction during the trolling or retrieving operation. This supports the hook just underneath the rear portion as clearly shown.

When a fish strikes the lure, the hook engages the mouth of the fish and the strain on the hook immediately disengages the snell from the slot so that the strain is transferred directly to the ring 25 and hence to the leader 26, it being clearly understood that no strain is attendent upon the lure itself at this time.

The method of manufacture of the lure is now described although drawings are not provided illustrating the mould as such is well known in the art.

A two-piece mould having the desired shape of the lure and mating along the central vertical section thereof is used. In addition, two flat plates are provided having attached thereto one each in half section, metal blocks of the required size, shape and location of the flotation block 20 and the air chamber or cavity 21.

The two halves of the mould are preheated, a spot of black plastic is placed in the eye cavity to form the eyes 34' and a touch of red on the gill lines (not illustrated) is also placed on the two halves of the mould. The lower front fin and baffle fin are filled with a plastic stiffer than the plastic used for the remainder of the lure and the cavity is then sprayed with an artist's air brush or the like in desired colors of plastic to form the natural looking exterior coat. A flat plate is then placed over each mould half of which is then filled with clear plastic. The two halves with their plates are cured to "set up" the plastic but not "cure out" completely. At this point the flat plates are removed leaving the gelled plastic with four half cavities, two for the wooden flotation block 20 and two for the air cavity or chamber 21.

The wood flotation block 20 is then inserted complete with the wire 24 and loop 25 and the two halves of the mould are then mated together and "cured out" in an oven thus resulting in a one-piece lure in colors desired so that the lure imitates the minnow, with the wooden block 20 completely hermetically sealed from moisture and the air chamber or cavity completely water tight.

In operation, the lure having completely neutral buoyancy may be trolled at the desired depth, said depth being easily maintained. The inclination of the baffle fin will assist in taking down the lure under normal conditions but split lead shot may be added to the leader or line if desired although normally this is not necessary. The delicate balance achieved by the neutral buoyancy, assisted by the shape and position of the baffle fin 16 gives extremely natural articulated action to the lure providing same is moved relatively slowly through the water.

It will be appreciated that objects moving through water are surrounded by a pressure or barrier wave. As the lure is virtually weightless in the water, this barrier wave acts as a buffer allowing the lure to be fished slowly in and around weed beds and obstacles where heavier than water lures, jigs, and the like are impossible to operate except perhaps at excessive speed.

Conventional lures require a rate of retrieve or trolling usually much faster than the normal swimming speed of live minnows in order to impart the necessary action and to maintain proper depth.

The present lure is not dependent upon excessive forward motion to simulate the life-like swimming action of small bait fish nor is speed necessary for depth keeping. As mentioned before, depths can be controlled with one or two split lead shots on the line leader.

Summing up, the neutral buoyancy is provided by the material 20 and the air cavity 21 and the articulation is initiated by the baffle fin 16. Of importance is the fact that the strain of the fish on the hook is taken directly via the snell to the leader thus eliminating possibilities of damage to the lure or loss of the fish due to the lure separating.

Figure 7:
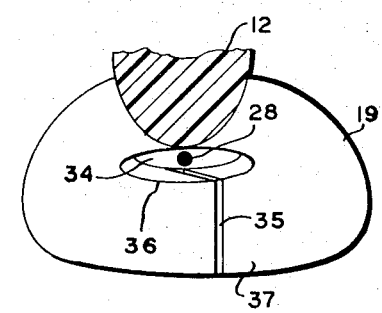
FIG. 7 shows an alternative method of holding the snell.

FIG. 7 shows an alternative method of holding the snell 28 within the baffle fin 19 when heavier hooks and flexible metal wire snell is used on larger lures. A horizontal elliptical aperture 34 is formed through the fin 19 at the base of the lure body 12. A slit 35 extends from the lower boundary 36 of the aperture 34 through the fin to the lower boundary 37 of the fin, said slit being at an angle so that the snell rests on the continuous lower boundary of the aperture. The size of the aperture 34 is such that the snell rides freely therein so that it does not interfere with the action of the tail portion and the strain is transferred directly to the line 26.

It will also be appreciated that, if desired, a further air chamber 21A may be formed in the front portion 11 just behind the flotation block 20 if additional buoyancy is required in relatively large lures.

FIGS. 8 to 11 inclusive show a further embodiment of the invention in which reference character 38 illustrates generally the body portion of the lure having a nose portion 39, and other portions 40, 41.

In this embodiment, the nose portion 39 is formed from a cured plastic having a higher durometer reading than the remainder of the lure. This means that this portion of the lure is stiffer or less resilient thus enabling the nose wire 42 to be embedded therein and to be held thereby without displacement during normal use.

An air cavity 43 is formed in the remainder of the body portion surrounded by lure material having a lower durometer reading and thus being more resilient or softer.

I have found that a mould can be partially filled with uncured plastic and then rotated and heated which causes the plastic to get on the walls of the mould thus forming a hollow lure, the hollow portion being determined by the amount of plastic initially introduced within the mould, speed of rotation, heat, and curing characteristics and the like.

A precisely measured amount of plastic will result in a lure with a buoyancy chamber 43 exactly offsetting the mass of the cured plastic resulting in neutral buoyancy, with the weight of the hook element 44 being taken into consideration. The nose portion 39 is preferably formed from a cured plastic of higher durometer reading.

The same temperature-time cycle applies to all durometer readings of the same plastic so that when the cycle is completed, the high durometer nose and low durometer hollow body portion are cured into one integral lure with the nose loop securely anchored in a small area of very stiff plastisol as indicated by reference character 39. This eliminates the need for the anchor block described in the previous embodiment.

Figure 8:
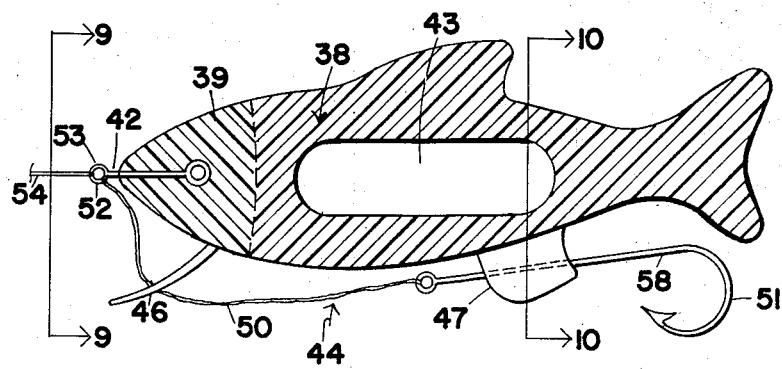
FIG. 8 is a side elevation of a further embodiment of the lure.
Figure 9:
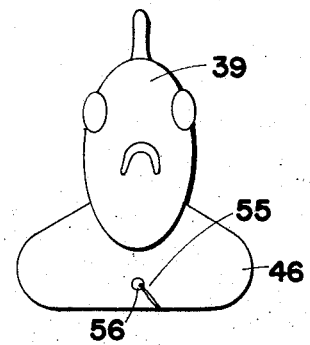
FIG. 9 is a front view of the lure of FIG. 8 substantially along the line 9—9 of FIG. 8.

I have also formed a transversely situated baffle 46 of high durometer plastic which extends downwardly and forwardly from the nose portion 39 as clearly shown in FIGS. 8 and 9. I have found that this gives a good lifelike swimming action particularly in larger lures and at relatively slow speeds.

In this particular type of lure, I form an anal fin 47 integrally with the body portion and situated as indicated in FIG. 8.

Figure 10:
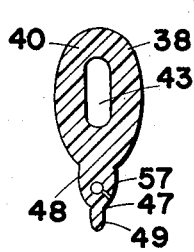
FIG. 10 is a section substantially along the line 10—10 of FIG. 8.

This anal fin includes a relatively broad cross sectioned portion 48 and a narrow lower portion 49 as shown in FIG. 10.

The hook element 44 hereinbefore described includes the snell 50 and the hook 51 attached thereto, one end 52 of the snell attaching to the nose wire 42 as at 53, in the same way that the fishing line 54 is secured. The baffle 46 if provided with the diagonal slot 55 terminating in a drilling 56 as hereinbefore described for the previous embodiment so that the snell 50 may engage the slot 55 and normally run freely through the aperture 56. The anal fin is also provided with a slot or slit 57 within which the shank 58 of the hook 51 may engage and be held in the position shown in FIG. 8 until struck by a fish. At that time the hook disengages from the anal fin and the snell disengages from the baffle 46 so that the strain is taken directly upon the nose element 42 and thence to the line 54 as hereinbefore described for the previous embodiment.

Figure 11:
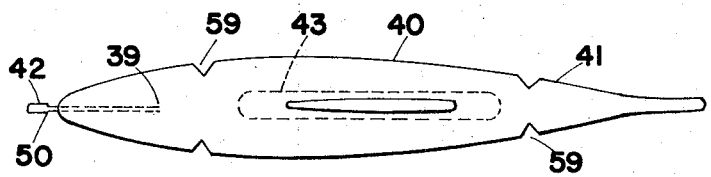
FIG. 11 is a top plan view of FIG. 8.

In some lures I have found that articulation is best provided by a plurality of pairs of vertical grooves 59 formed in the sides of the body portion as clearly shown in FIG. 11. These grooves divide the body portion into a plurality of portions 39, 40 and 41 and may be provided as desired. The plurality of pairs of V slots 59, together with the transverse baffle 46 give excellent articulation, the rear portion 41 being assisted by the anal fin 47.

Various modifications can be made within the scope of the inventive concept which is herein disclosed and/or claimed.

What I claim as my invention is:

1. A fishing lure comprising in combination a substantially fish shaped body portion of relatively soft resilient plastic, means to control the buoyancy of said lure, in said body portion, line attaching means secured within the front nose part of said body portion, a hook and snell element secured by one end thereof to said line attaching means, and means to detachably retain the remainder of said hook portion of said hook and snell element adjacent the underside of said body portion until engaged by a fish whereupon the strain of said fish upon said hook and snell element is transferred directly to said line attaching means, and a baffle fin inclining downwardly and forwardly from the underside of said body portion.

2. The device according to claim 1 in which said means to control the buoyancy of said lure includes a sealed air cavity within said body portion.

3. The device according to claim 1 in which said means to control the buoyancy of said lure includes, additionally, an insert of flotation material in the forward part of said body portion, said line attaching means extending from said flotation material through the front of said body portion to the nose of said lure.

4. The device according to claim 2 in which said means to control the buoyancy of said lure includes, additionally, an insert of flotation material in the forward part of said body portion, said line attaching means extending from said flotation material through the front of said body portion to the nose of said lure.

5. The lure according to claim 1 which includes vertical grooves on the outer surfaces thereof dividing said lure into a plurality of parts to permit limited articulation of said parts in a horizontal plane.

6. The lure according to claim 1 in which the snell on said hook is secured to said line attaching means at the nose of said lure, and a snell receiving slot in said baffle fin, said snell being detachably securable in said slot.

7. The lure according to claim 2 in which the snell on said hook is secured to said line attaching means at the nose of said lure, and a snell receiving slot in said baffle fin, said snell being detachably securable in said slot.

8. The lure according to claim 3 in which the snell on said hook is secured to said line attaching means at the nose of said lure, and a snell receiving slot in said baffle fin, said snell being detachably securable in said slot.

9. The lure according to claim 4 in which the snell on said hook is secured to said line attaching means at the nose of said lure, and a snell receiving slot in said baffle fin, said snell being detachably securable in said slot.

10. The lure according to claim 5 in which the snell on said hook is secured to said line attaching means at the nose of said lure, and a snell receiving slot in said baffle fin, said snell being detachably securable in said slot.

11. A fishing lure comprising in combination a substantially fish shaped body portion of relatively soft resilient plastic, having a front part, a rear part and a nose on said front part, neutral buoyancy controlling means in said body portion, line attaching means secured by one end thereof to said body portion and extending forwardly through said front part of said body portion, to the said nose of said lure and being formed in a loop or the like externally of said nose, a transversely situated baffle fin extending downwardly from said body portion, said baffle fin being provided with a snell receiving slot, a snelled hook being secured by said snell to said looped portion, said snell detachably engaging said snell receiving slot to maintain the hook of said snelled hook adjacent the underside of said lure until taken by a fish whereupon said snell disengages from said snell receiving slot and the strain of said fish is transferred directly via said snell, to the looped portion of said line attaching means, said neutral buoyancy controlling means including a sealed air cavity in said body portion, said cavity being situated above the longitudinal axis of said lure whereby the center of gravity of said lure is below the longitudinal axis thereof.

12. The lure according to claim 11 in which the junction of said front part and said rear part of said lure is vertically grooved on the outer surfaces thereof to permit limited articulation of said parts in a horizontal plane.

13. The lure according to claim 11 in which said baffle fin inclines downwardly and forwardly from said rear part.

14. The lure according to claim 12 in which said baffle fin inclines downwardly and forwardly from said rear part.

15. The lure according to claim 6 in which said baffle fin is situated adjacent the nose of said body portion and an anal fin projecting downwardly from said body portion rearwardly of said baffle fin.

16. The lure according to claim 15 which includes a hook shank receiving slot in said anal fin to detachably hold said hook in position adjacent said body portion.

17. The lure according to claim 15 which includes a plurality of pairs of vertical grooves formed in the sides of said body portion to induce articulation of the parts of said body portion defined by said pairs of grooves.

18. The lure according to claim 16 which includes a plurality of pairs of vertical grooves formed in the sides of said body portion to induce articulation of the parts of said body portion defined by said pairs of grooves.

19. A fishing lure comprising in combination a substantially fish shaped body portion of relatively soft resilient plastic, the nose portion of said body portion being formed of a plastic of higher durometer density than the remainder of said body portion, a sealed air cavity in said remainder of said body portion to control the neutral buoyancy of said lure, line attaching means secured by one end thereof to said body portion and extending forwardly through said front part of said body portion, to the nose of said lure and being formed in a loop or the like externally of said nose, a transversely situated baffle fin extending downwardly from said body portion, said baffle fin being provided with a snell receiving slot, a snelled hook being secured by the snell thereof to said looped portion, said snell detachably engaging said snell receiving slot to maintain the hook of said snelled hook adjacent the underside of said lure until taken by a fish whereupon said snell disengages from said snell receiving slot and the strain of said fish is transferred directly via said snell, to the looped portion of said line attaching means, said baffle fin being situated adjacent the nose of said body portion and an anal fin projecting downwardly from said body portion rearwardly of said baffle fin.

20. The lure according to claim 19 which includes a hook shank receiving slot in said anal fin to detachably hold said hook in position adjacent said body portion.

21. The lure according to claim 19 which includes a plurality of pairs of vertical grooves formed in the sides of said body portion to induce articulation of the parts of said body portion defined by said pairs of grooves.

* * * * *